INVENTOR.
EUGENE A. GLASSEY
BY Julian Caplan
PATENT ATTORNEY

Nov. 4, 1969    E. A. GLASSEY    3,475,959
INSTRUMENT FOR GAUGING LIQUID DEPTH
Filed Feb. 13, 1967    4 Sheets-Sheet 1

INVENTOR.
BY

INVENTOR.
EUGENE A. GLASSEY
BY Julian Caplan
PATENT ATTORNEY

Nov. 4, 1969  E. A. GLASSEY  3,475,959
INSTRUMENT FOR GAUGING LIQUID DEPTH
Filed Feb. 13, 1967  4 Sheets-Sheet 2

INVENTOR.
BY

INSTRUMENT FOR GAUGING LIQUID DEPTH

INVENTOR
EUGENE A. GLASSEY
BY [signature]
PATENT ATTORNEY

INVENTOR.
EUGENE A. GLASSEY
BY Julian Caplan
PATENT ATTORNEY

Nov. 4, 1969  E. A. GLASSEY  3,475,959
INSTRUMENT FOR GAUGING LIQUID DEPTH

Filed Feb. 13, 1967  4 Sheets-Sheet 4

INVENTOR.
BY

United States Patent Office 3,475,959
Patented Nov. 4, 1969

3,475,959
INSTRUMENT FOR GAUGING LIQUID DEPTH
Eugene A. Glassey, Los Altos, Calif. (% Exactel Instrument Company, 89 Alice Ave., Mountain View, Calif. 94040)
Filed Feb. 13, 1967, Ser. No. 615,716
Int. Cl. G01f 23/20, 23/00
U.S. Cl. 73—296                              7 Claims

ABSTRACT OF THE DISCLOSURE

An instrument to gauge liquid depth and quantity. By purge bubble system or other means the depth is balanced by gas pressure which is applied to a cistern to balance a mercury column. Weight of the column (or cistern) is applied to a beam balance. The poise of the balance is driven along the beam by a reversible motor and perforated tape. The motor is energized in either direction by electrical contacts associated with the beam.

---

Figure 1:
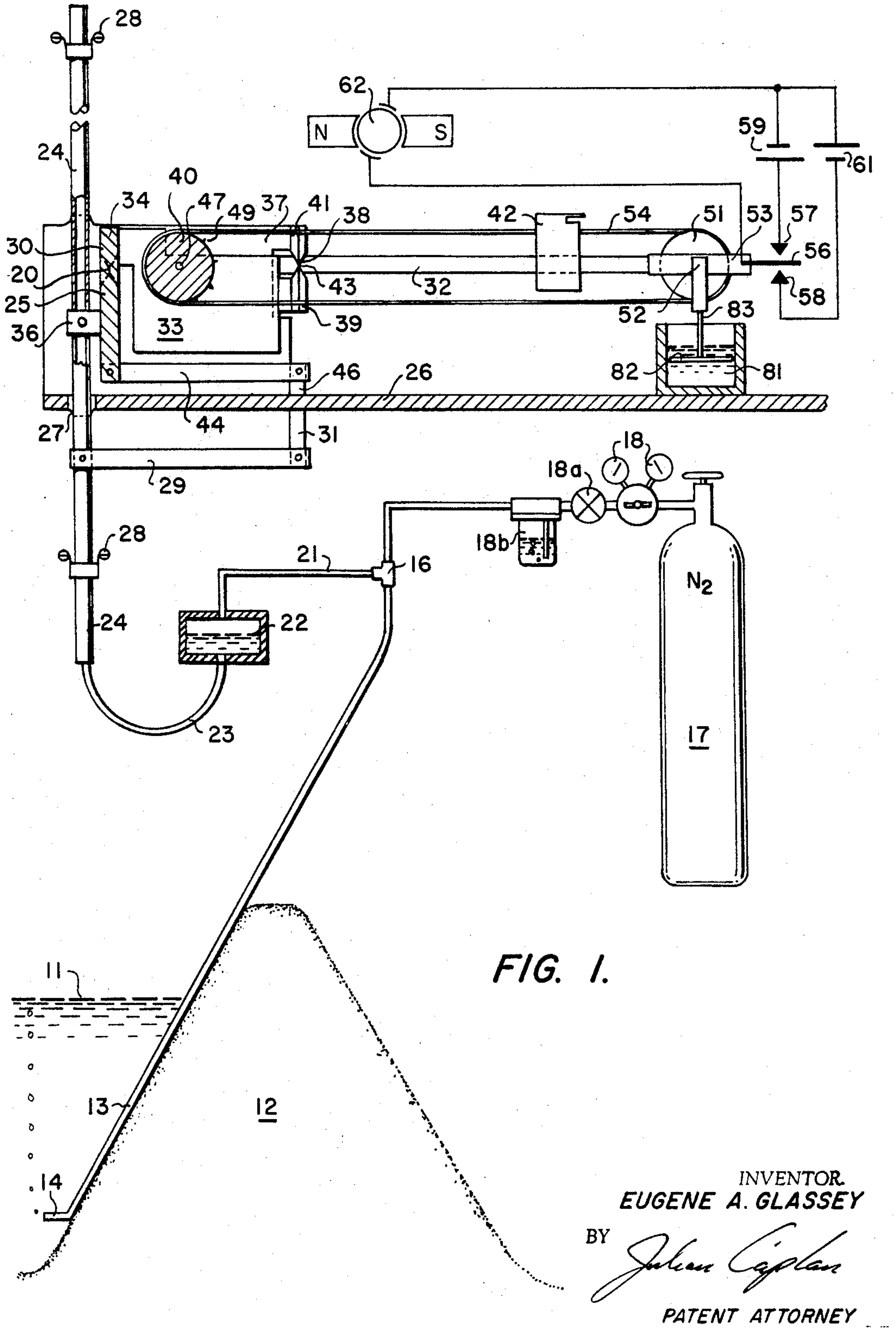

This invention relates to a new and improved instrument for gauging liquid depth and quantity for hydrological, precipitation and tank content measurement. The present invention has particular application to an instrument located in a remote region such as mountainous or otherwise remote area where electrical power lines are not readily available and where an attendant is not present.

A primary application of the invention is for river and stream depth gauging along stream beds. In the accompanying drawings, the apparatus is shown measuring water heights behind dams, for facility in illustration. However, more common usages would be in stream, rain and tank gauging for which accuracy of 0.01 or 0.02 feet over a fairly narrow span of e.g. 60 foot maximum is adequate and is readily achieved by use of this invention.

When used in depth gauging, as in tanks, the invention lends itself well to use with liquids which are difficult, such as those at high temperature, liquified gases and chemically active materials.

One of the features of the invention is the fact that it provides an accurate, high capacity gauging instrument but one which is mechanically not complex, and hence is easily transportable and does not require frequent maintenance. The construction also lends itself to a modest size dust and weather-tight enclosure.

A further feature of one form of the invention hereinafter described is the fact that a mercury manometer is provided which is temperature compensating and does not require separate temperature compensation. A further feature is that the principles employed are fundamentally those of a mass comparison process and the system, in addition to being self compensating for temperature in the manometric system, compensates for temperature in the liquid being gauged, inasmuch as the system responds to pressure at the lower tip of a piezometer line. For a given quantity of liquid the reading is unaffected by thermal expansion or contraction, as surface level measurements would be. Similarly the technique is unaffected by variations in the earth's gravitational field, as at different geographic locations, which would be a source of error in purely pressure responsive instruments.

In essence, in accordance with the invention, the hydrological depth or precipitation information becomes a force on a self-balancing beam balance. This force is counterbalanced by a poise which is mechanically moved along the beam by a reversible motor which is energized by contacts on the beam and adjacent thereto. The motor brings the beam into balance and the turning of the motor drives an indicator mechanical counter and output shaft, the latter suitable for actuating appropriate types of data recorders and transmitters or for control function.

Other objects of the present invention will become apparent upon reading the following specification and referring to the accompanying drawings in which similar characters of reference represent corresponding parts in each of the several views.

Figure 2:
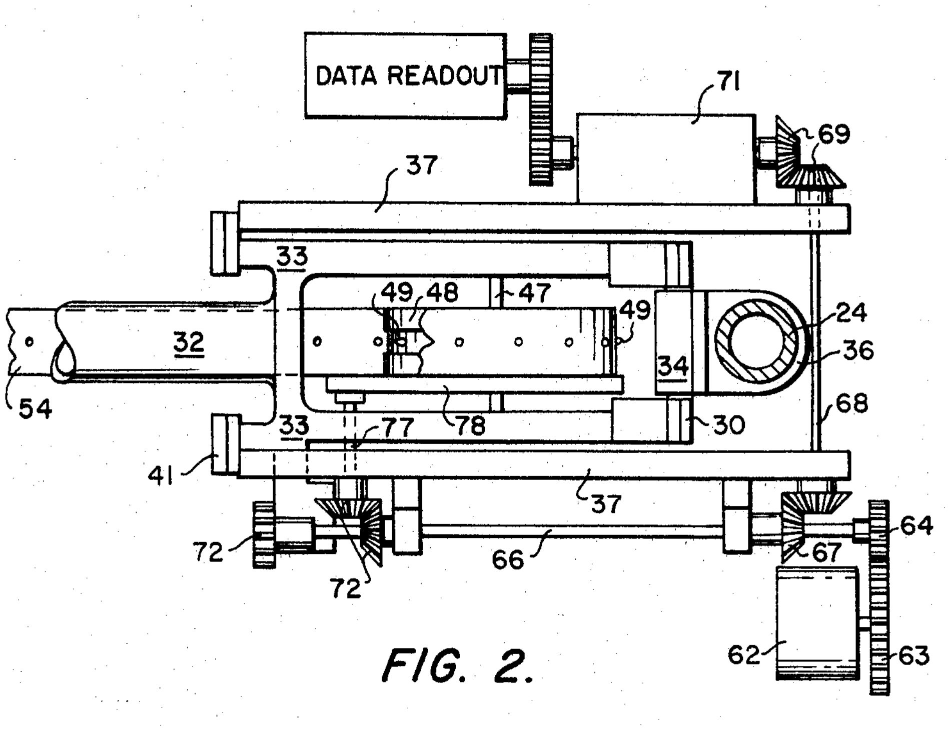
Figure 3:
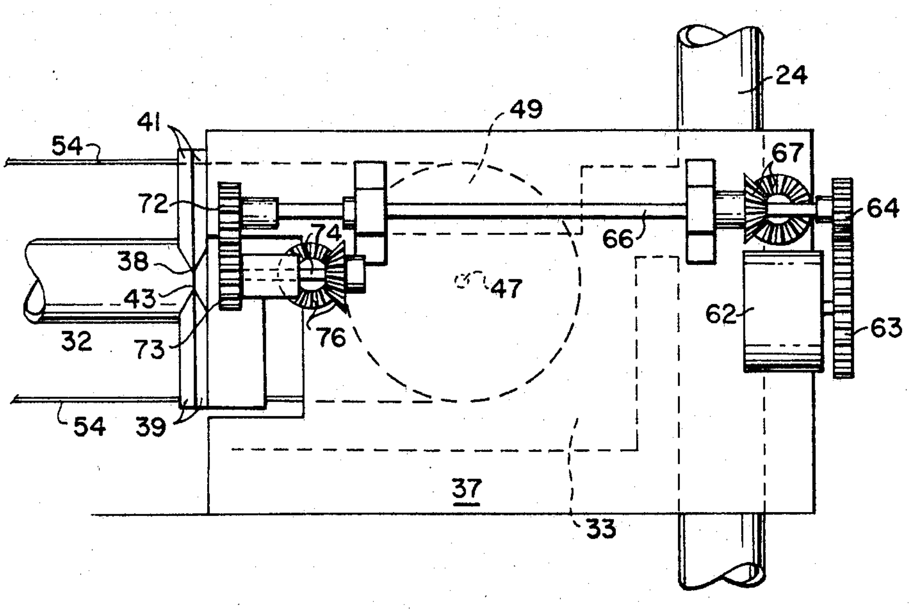
Figures 4, 5, 6:
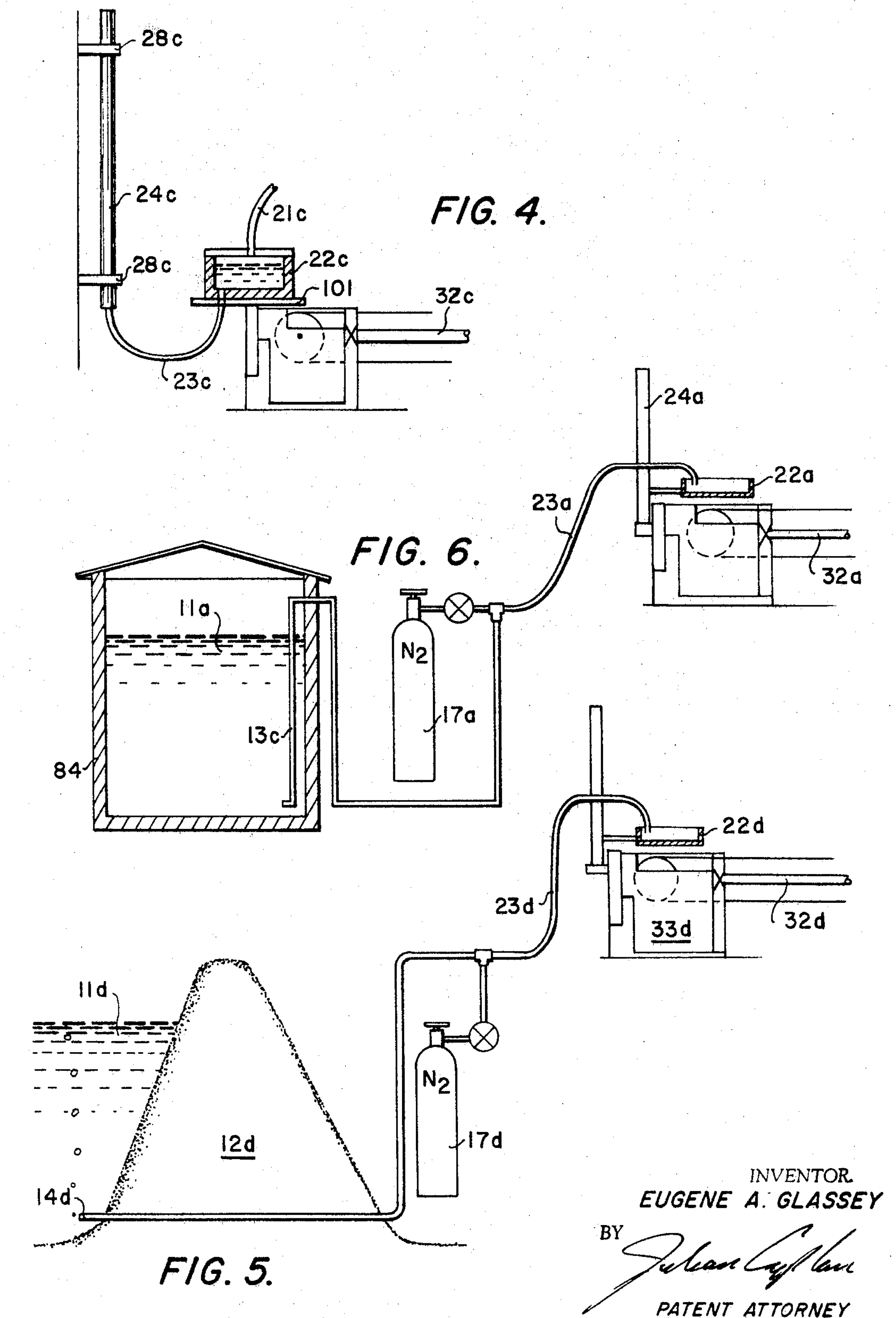
Figure 8:
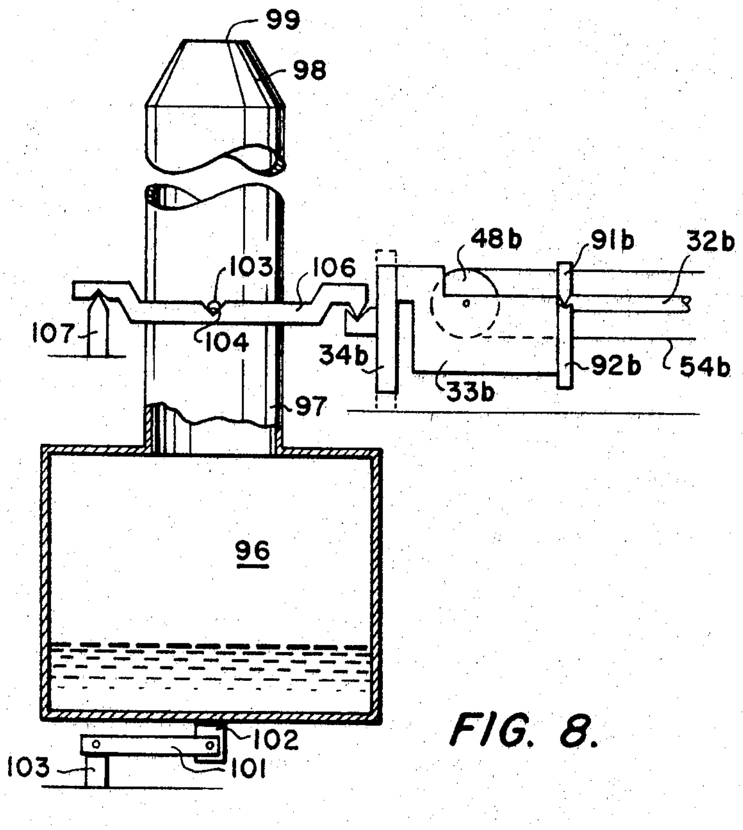
Figure 7:
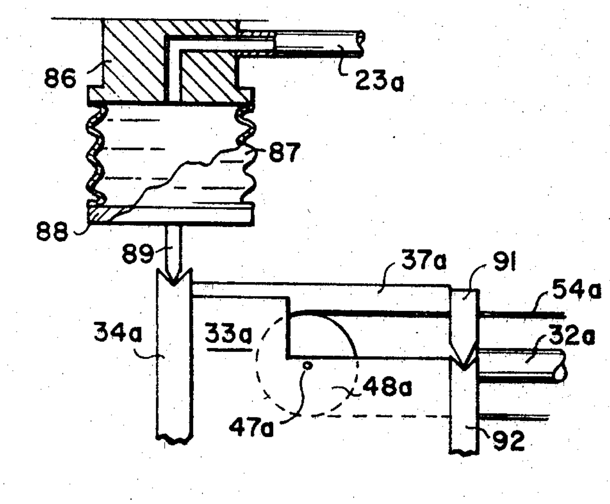

In the drawings:
FIG. 1 is a partially schematic view showing one form of the invention used to measure the height of water by a purge bubble method.
FIG. 2 is a top plan of a part of the mechanism of FIG. 1.
FIG. 3 is a side elevation of the structure of FIG. 2.
FIG. 4 is a schematic view of a modification of the structure of FIGS. 1 to 3.
FIG. 5 is a schematic view of a modification of FIG. 1 showing a variation of liquid height measurement.
FIG. 6 is a schematic view of tank height measurement.
FIG. 7 is a fragmentary view of a modification of FIG. 1.
FIG. 8 is a fragmentary view of a part of still another modification showing use in a rain gauge.

In the modification of FIG. 1, the instrument is shown measuring the level of water 11 behind a dam 12. For this purpose the system operates on the well known purge bubble system such as described in U.S. Army Engineering District, Corps of Engineers, Sacramento, California Civil Works Investigations Project 79, Project Bulletin 3, entitled "Design and Operation of Water Level Measuring Equipment." A piezometer tube 13 runs to a point 14 near the bottom of the lake behind the dam or other body of liquid and leads to a fitting 16 which is connected to a tank of compressed gas 17 such as nitrogen with conventional pressure reducer and gauges 18, needle valve 18a and bubble sight glass 18b interposed between the tank 17 and fitting 16. Valve 18a is adjusted so that bubbles of gas (observed through glass 18b) are emitted from the outlet 14 at intervals and thus the pressure in conduit 13 is equal to the hydrostatic pressure at outlet 14 which is, in turn, proportional to the height of the water 11, except for negligible errors caused by the weight of gas in line 13 and pressure drop caused by the small flow of gas therein.

Pipe 21 leads from fitting 16 to the top of a manometer cistern 22 containing mercury or other suitable liquid. A flexible tube 23 leads from the bottom of cistern 22 to the bottom of manometer tube 24 which would normally be of stainless steel. The height of mercury in tube 24 is then proportional to the water level 11. Manometer 24 is supported for limited, substantially vertical movement relative to the base 26 of the instrument. As illustrated herein, a flexible fitting 27 is provided surrounding an aperture in base 26 and a ring guide 28 surrounds the upper end of the tube and is fastened to a stationary support. The lower end of tube 24 may be supported by a pivoted lever 29 pivoted at one end to the tube and at the other end to an arm 31 depending from base 26.

The instrument which is used to measure the height of liquid in tube 24 in practical effect weighs the tube and contents. For such purpose there is provided a horizontal beam 32 which is fixed to a pair of vertical, horizontally spaced parallel blocks 33. The ends of blocks 33 are connected to a vertical block 34 which is fastened to tube 24 by clamp 36. A stationary member 37 is provided at the top of blocks 33. On either side of the instrument are pairs of flexure pivots consisting of flexible metallic strips 38 clamped to blocks 33 or stationary support 37 by clamp members 39, 41, respectively. A poise 42 is arranged to move along the beam 32 to counterbalance the weight of the tube 24. Tilting of beam 32 is accomplished by flexing of strips 38, the free portion of strip 38 indicated by reference numeral 43 in FIG. 1 serving as a fulcrum. Further to support the beam 32, block 34 is connected at its lower end to pivoted lever 44 which is pivoted to a foot 46 attached to base 26. Arm 31 and foot 46 are in vertical alignment with the plane of strips 39. To hold tube 24 vertical while beam 32 tilts, block 34 and clamp 36 are interconnected by flex strips 20 clamped by clamp members 25, 30 attached to block 34 and stationary members 37. Between blocks 33 and rotatable relative thereto about shaft 47 is a sprocket 48 having spoke-like pins 49. An idler sprocket or pulley 51 is supported by shaft 52 between the bifurcated ends 53 of beam 32. A continuous perforated metal tape 54 passes around sprocket 48 and pulley 51, the spacing between the holes in the tape being accurate and equal to the spacing between pins 49. Tape 54 is fixed to poise 42.

The outer end of beam 32 carries an electrical contact 56. Spaced above and below contact 56 are contacts 57, 58 which are connected to reversed polarity batteries 59, 61, respectively. A reversible permanent magnet motor 62 is driven in either direction by sources 59, 61, depending upon whether the outer end of the beam 32 is raised or lowered and hence whether contact 56 engages contact 57 or 58. Motor 62 turns gear 63 which meshes with pinion 64 on horizontal shaft 66. Mounted on shaft 66 are a pair of bevel gears 67 connected to transverse shaft 68 which in turn is connected by means of a second pair of bevel gears 69 to a counter 71. The opposite end of shaft 66 carries a spur gear 68 immediately above a second spur gear 69 mounted on shaft 71 on one of the blocks 33. Thus when block 33 rocks as beam 32 tilts, nevertheless a proper meshing of gears 72, 73 is maintained despite the fact that shaft 66 is stationary and shaft 74 tilts with the beam inasmuch as the relative movement between gear axes is very slight and not sufficient to interfere with suitable gear mesh. Further, at the condition of balance the gears are restored to the same relative position of proper mesh. In addition the orientation of gears 72 and 73, through which torque is transmitted between the "fixed" and "movable" portions of the transmission is such that balance position is unaffected by the transmittal of torque required to position the poise. (The fixed portion being that which is mounted to the fixed frame and the movable portion being that which is mounted to the movable beam.) Further, in the preferred arrangement of the transmission, as diagrammed, the drive motor, counter, output shaft to data acquisition equipment and other transmission elements or components requiring or involving relatively high or variable torque are all located on or related to the fixed frame to preclude interference with proper balancing. Shaft 74 is connected by a third pair of bevel gears 76 to a transverse shaft 77 which leads to a gear reduction train of gears indicated generally by reference numeral 78 which drives sprocket shaft 47. Hence when the beam 32 is out of balance, motor 62 is turned until the poise 42 is moved by the tape 54 into balance. Excessive movement of the beam 32 is damped by a dashpot 81 mounted on base 26 and having a piston 82 connected by arms 83 to the bifurcated ends 53 of beam 32.

In operation, the height of the water or other liquid affects the pressure at outlet 14 and this varies the height of the mercury in manometer tube 24, the temperature being automatically compensated inasmuch as the quantity of mercury required to attain balance is dependent upon mass rather than volume. Increase or decrease in the quantity of mercury in tube 24 causes the beam 32 to tilt. When the height of water 11 increases, the end 53 of beam 32 tilts upward engaging contacts 56, 57 and turning motor 62 to turn tape 54 to move poise 42 outward and bring the beam into balance. A decrease in the height of water 11 causes an opposite movement. The movement of poise 42 is read on counter 71 and this reading is proportional to the height of the water 11. In addition, a proportional shaft 75 is provided for actuating suitable well-known data acquisition, transmitting or control equipment of existing types.

A modification of the structure of FIGS. 1 to 3 is shown in FIG. 4. In this version of the invention, manometer tube 24*c* is mounted on a fixed support by brackets 28*c*. Thus the problems of supporting along tube on a scale beam are simplified. Cistern 22*c* is mounted on pan 101 on top of block 34*c*. Tube 21*c* and tube 23*c* are flexible. In effect, the scale weighs the mercury remaining in the cistern instead of that in the tube, but the practical effect is the same. Many of the parts are the same as in the preceding modifications and corresponding parts are designated with the same reference numerals followed by the subscript *c*.

The invention may also be used in a tide gauge, to measure ocean depths along beaches or shores.

FIG. 5 shows a system similar to FIG. 1, wherein piezometer tube 13*d* is carried through the base of dam 12*d* and the equipment 17*d*–21*d* is located on the downstream side of the dam. Subscript *d* is used to distinguish parts of this modification from the preceding modifications.

FIG. 6 illustrates adaption of the invention to tank depth gauging. Tank 84 may contain fuel oil or a variety of other liquids. Tube 13*c* terminates adjacent the bottom of the tank. Other elements resemble those of the preceding modification and the same reference numerals followed by subscript *c* are used to designate corresponding parts.

Turning now to FIG. 7, the tube 23*a* which corresponds to tube 23 of the preceding modification leads to an end plate 86 on one end of a flexible bellows 87, the opposite end 88 of which is connected by rod 89 to block 34*a* which is equivalent to the block 34 of the preceding modification. Knife edge 91 is fixed to beam 32*a* and rests upon a fulcrum block 92 which permits the beam 32*a* to tilt. Knife edge 91 and flexure strips 38 are functionally interchangeable. Thus the mounting of the beam may be by either of the means described in any of the modifications illustrated and described. In other respects the elements of the modification of FIG. 7 are similar to the preceding modification and the same reference numerals followed by the subscript *a* are used to designate corresponding parts.

In the modification of FIG. 8, a rain gauge is shown. Such a gauge has a collector can 96 at the bottom of a pipe 97 having a conical type of top 98 having an opening 99 at the top of fixed diameter. Precipitation entering through the opening 99 drops to the collector can 96, the lower end of which is supported by means of pivot lever 101 pivoted at one end to an extension 102 of can 96 and at the other end to a fixed standard 103. Pipe 97 has a pair of horizontal projecting studs 103 fitting in notches 104 on horizontal lever 106. Lever 106 is supported at its outer end by knife edge 107 and at its inner end is connected to block 34*b* which corresponds to block 34 of the modification of FIG. 1. Hence, as the amount of precipitation which has fallen through ring 99 increases, the weight imposed on block 34*b* increases causing the beam (not shown) to tilt as in the preceding modification. The reading on the indicator and output shaft thus indicate the quantity of precipitation. Parts corresponding to the preceding modification are marked by corresponding reference numerals followed by the subscript *b*.

What I claim is:

1. An instrument of the character described comprising a body of liquid to be gauged, a first tube having an opening adjacent the bottom of said body, a second tube communicating with said first tube remote from said bottom, pressure regulating means for adjusting pressure in said second tube to balance the pressure in said first tube; a frame, remote from and at an elevation different than the bottom of said body, a beam, support means supporting said beam on said frame for tilting movement about a fulcrum, force means applying to said beam a force proportional to said pressure in said second tube of liquid tending to tip said beam about said fulcrum in a first direction, a poise movable along said beam and tending to tilt said beam in a direction opposite asid first direction, a reversible motor, mechanical means driven by said motor to move poise along said beam, a first electrical contact movable with said beam, second and third electrical contacts engaged by said first contact when said beam tilts up or down, respectively, a source of electric current connected to each of said contacts and to said motor to turn said motor to move said poise to bring said beam into balance, and readout means driven by said motor proportional to movement of said poise to indicate the strength of said force.

2. An instrument according to claim 1 in which said force means comprises a manometer tube fixed for movement with said beam, and which further comprises a cistern, a flexible conduit between said cistern and said manometer tube, and means for applying pressure to said cistern proportional to said quantity.

3. An instrument according to claim 2 in which said last-named means comprises a source of fluid under pressure, means for dispensing said fluid and applying to said fluid when dispensed a pressure dependent on said quantity, and means for transmitting said pressure to said cistern.

4. An instrument according to claim 1, in which said force means comprises a cistern fixed for movement with said beam and which further comprises a stationary manometer tube, means for applying pressure to said cistern proportional to the pressure adjacent the bottom of said body and flexible conduits between said cistern and said manometer tube, and between said last-named means and said cistern.

5. An instrument according to claim 1, in which said mechanical means comprises a continuous tape, and pulleys on opposite ends of said beam for supporting said tape, said tape connected to said poise, one said pulley driven by said motor to drive said tape.

6. An instrument according to claim 1 in which said support means comprises flex strips fixed to said frame and to said beam.

7. An instrument according to claim 1, in which said force means comprises an expansible bellows, a link connecting said bellows to said beam, and means for applying pressure to said bellows proportional to said quantity.

References Cited

UNITED STATES PATENTS

| | | | |
|---|---|---|---|
| 1,258,268 | 3/1918 | Sorge | 73—296 |
| 1,759,900 | 11/1927 | Hadley | 177—265 XR |
| 2,629,258 | 2/1953 | Nothmann et al. | 73—171 |
| 3,371,731 | 3/1968 | Connors et al. | 177—168 XR |

LOUIS R. PRINCE, Primary Examiner

W. A. HENRY II, Assistant Examiner

U.S. Cl. X.R.

73—302